June 28, 1938.    W. K. HAWKS    2,122,371
BRAKE CYLINDER ASSEMBLY AND METHOD OF MAKING SAME
Filed Feb. 15, 1935
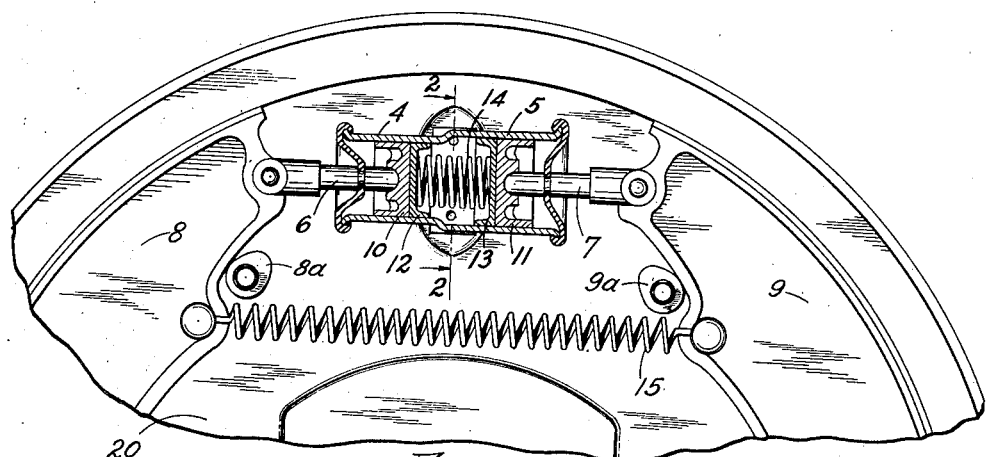
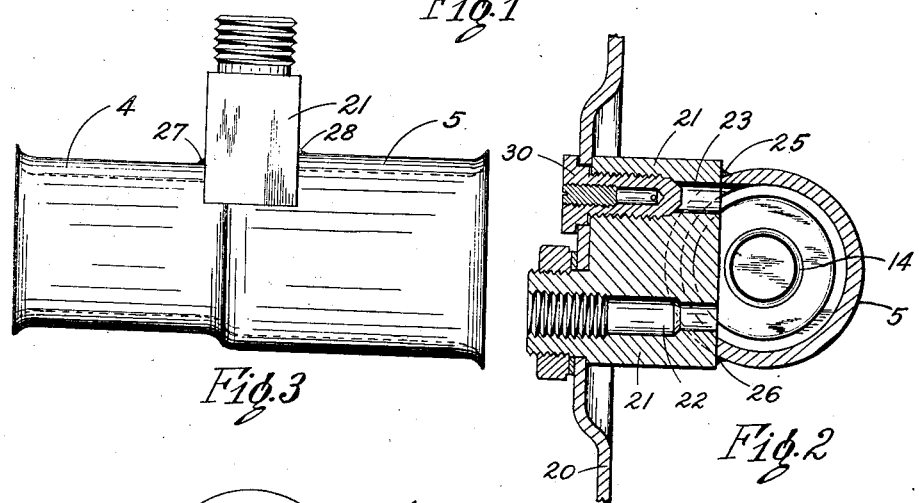
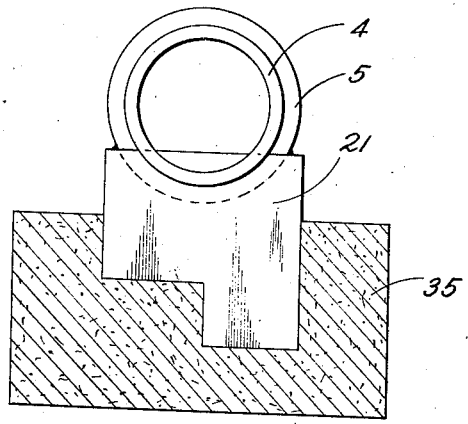
Inventor
WILLIAM K. HAWKS Patented June 28, 1938

2,122,371

UNITED STATES PATENT OFFICE 2,122,371

BRAKE CYLINDER ASSEMBLY AND METHOD OF MAKING SAME

William K. Hawks, Euclid, Ohio, assignor to The Weatherhead Company, Cleveland, Ohio, a corporation of Ohio Application February 15, 1935, Serial No. 6,724

12 Claims. (Cl. 29—152.1)

This invention relates to hydraulic brakes and more particularly to a wheel brake cylinder assembly employed in connection with hydraulic brakes for motor vehicles.

A type of hydraulic brake for motor vehicles widely used employs a pair of oppositely extending cylinders arranged on a backing plate in a manner to actuate simultaneously a pair of brake shoes pivoted on the backing plate. Since the pressures developed in the cylinders during brake actuation are high, it has been necessary to provide a heavy casting to withstand the pressures and a strong bracket or base to fix the casting to the backing plate. The cylinders and mounting means therefor generally have been formed of integral iron castings which require several machining operations such as boring or reaming the cylinders to provide a smooth interior surface and the boring and threading of an inlet conduit and an air bleeding conduit. Recent types of brakes have embodied cylinders of unequal diameters to apply different expanding forces to the brake shoes, and this change has further increased the cost of machining the casting.

As will be understood by those skilled in the art the wheel brake cylinder assembly comprises a part of that weight of the vehicle referred to as "unsprung weight" and that it is extremely desirable to reduce this weight.

It is therefore among the objects of this invention to provide a cylinder assembly that is light in weight and yet of ample strength to withstand the high pressures developed. It is also among the objects of the invention to provide a brake cylinder assembly which will eliminate the casting operation and eliminate most of the machining operations. A further object of the invention is to provide a method for making a cylinder assembly as above described. A further object of the invention is to provide a method of making a brake cylinder assembly by securing the elements of the assembly to each other along their abutting surfaces by welding or brazing. Another object is to provide an economical method of forming a fluid connection with a member having a curved outer surface without the necessity of forming a similar surface on the connection member.

Other objects relating to details of construction and economies of manufacture will appear hereinafter.

In the accompanying drawing, which illustrates a preferred embodiment of the invention:

Figure 1 is an elevation of the brake cylinder assembly mounted in position for use with a motor vehicle; Figure 2 is an enlarged sectional view taken on the line 2—2 of Figure 1; Figure 3 is a plan view of the brake cylinder assembly; Figure 4 illustrates the position of the parts of the assembly as supported during the brazing operation.

Referring to the drawing, a pair of oppositely extending cylinders 4 and 5 are preferably formed of a section of drawn metal tubing or sheet metal given the desired cylindrical shape. The cylinders may also be economically produced by stamping out a cup-shaped member and removing the base portion of the cup. Steel is especially suited for the production of cylinder assemblies according to my method because of its strength in proportion to its weight and because of the economies affected in working. The cylinders shown are coaxially arranged and of different diameters although it will be understood that the cylinders need not be coaxially arranged and that the diameters may be other than shown, depending upon the design of the brake mechanism and the braking effects sought.

In their operative position the cylinders 4 and 5 are supported by means of the block 21 upon a backing member 20 of the vehicle running gear. Actuating fluid is led to the chamber between the two cylinders to actuate the pistons 10 and 11. The movement of the pistons in response to the fluid actuation is transmitted to the brake shoes 8 and 9 through the connecting rods 6 and 7 carried by shoes 8 and 9, respectively. The pistons 10 and 11 are provided with the usual rubber sealing members 12 and 13 on the fluid side of the pistons and have positioned therebetween a coil compression spring 14 to hold the rubber sealing cups against the pistons. Rubber dust caps are applied to the outer end of the cylinders and retained thereon by inter-engaging flanges on the caps and cylinders. Adjustable stops 8a and 9a are preferably provided to limit the inward movement of the brake shoes and the corresponding inward movement of the pistons within the cylinders 4 and 5.

In order to conduct the actuating fluid from the master cylinder of the brake system into the cylinders 4 and 5, a conduit 22 is provided in the support block 21. This conduit may be formed in the block 21 before or after the block is secured to the cylinders and is provided with threads therein to receive a brake hose fitting. The side of the block 21 contacting the backing plate 20 is provided with a projecting threaded portion 26 received in a hole in the backing plate and fitted with a nut 25 functioning to hold the entire assembly on the backing plate. An air bleeding vent or conduit 23 is formed in the block 21 and is arranged tangentially to the inner surface of the cylinder 5 to insure a complete venting of the air in the cylinders. The conduit 23 is also internally threaded and is fitted with a vent plug 30 which extends through an aperture in the backing plate and supplements the securing action of the nut 25. The block 21 may be cut from rectangular bar stock and machined to provide the projection 26 or cut from a bar extruded to provide the projecting portion 26.

To secure the block 21 to the cylinders, portions of each of the cylinders are cut away, by a milling operation, for example, adjacent their junction with each other to provide an opening to receive the block 21. The cutting operation is preferably carried out to provide plane surfaces surrounding the opening adapted to contact with the plane side and end surfaces of the block. The block extends within the opening a substantial distance and forms with the curved wall opposite the opening an inlet chamber which opens into each of the cylinders 4 and 5. To fix the block 21 within the opening, I prefer to braze or weld the adjoining surfaces of the block and the cylinders preferably by copper brazing in a controlled atmosphere.

To economically carry out the brazing operation, the block 21 is fitted in the opening with a light press fit and is supported in suitable recesses in a carbon or analogous heat resistant block 36 as shown in Figure 4. Copper or copper alloy is supplied to the block and cylinders in any convenient manner, for instance the parts may be sprayed with a lacquer containing powdered copper in suspension, the parts may be copper plated or copper wire applied to the parts adjacent the surfaces to be joined. The assembly when supplied with copper is placed within a furnace having a reducing atmosphere which may be produced by the partial combustion of a mixture of natural gas and air in a manner well known to those skilled in the art of copper brazing.

The assembled parts are heated in the furnace to a temperature of about 2150° F. At this temperature and in the proper atmosphere, the copper becomes fluid and apparently alloys with the underlying steel surfaces. The fluid copper enters the spaces between the block and the walls of the opening and is drawn by capillary attraction into the minute interstices between the block and the walls. The brazing operation thus produces an exceptionally strong and fluid tight alloy bond between the block and the adjacent wall surfaces of the cylinder. Preferably the joint is further reinforced by supplying sufficient copper to cause the formation of fillets as indicated at 25 and 26 in Figure 2 and 27 and 28 in Figure 3. A further advantage of the copper brazing method is that the parts are cleaned and brightened during the process, and further there is no necessity for further cleaning or pickling.

It will be seen that by my method, my brake cylinder can be produced rapidly and economically with a minimum of machining operations required. The fluid connection for the cylinders is made in a simple manner requiring only the milling of a slot in the wall of the cylinder and the welding or brazing of a suitable block therein. By my method, it is possible to make a fluid connection with a cylinder or with other hollow bodies having curved or irregular surfaces without the necessity of forming a corresponding curved or irregular surface on the fluid conducting and supporting member. By reason of the fact that the milling operation for cutting the slot or opening in the walls of the cylinder provides plane surfaces for contact with the fluid conducting and supporting block 21, the block can be made from ordinary bar stock without requiring any special machining operations. My brake cylinder assembly can thus be produced at low cost and the complete assembly is extremely strong and light in weight.

In the present specification, I have described a preferred embodiment of my invention as applied to hydraulic brake cylinders. Those skilled in the art will appreciate that various modifications and changes can be made without departing from the spirit and scope of my invention. For example, it will be apparent that my invention may be applied to the production of other fluid conducting devices wherein it is desired to form a fluid connection with a hollow member. It is therefore to be understood that my invention is not limited to the preferred embodiment described herein or in any manner other than by the scope of the appended claims.

I claim:

1. A brake cylinder assembly, comprising a tube circular in cross section having a portion of a wall thereof cut away to provide an opening, a fluid inlet block extending through said opening into the interior of said tube, said tube and said block having adjacent plane surfaces bonded together by a leak-proof alloy bond.

2. A brake cylinder assembly comprising a drawn metal tube formed to present a pair of oppositely extending cylinders, provided with an opening therebetween, means to support said cylinders and conduct actuating fluid thereto comprising a polygonal block extending into the interior of said tube opening and fixed therein, the edges of said opening abutting three faces of said block and attached thereto by means of an alloy bond.

3. A brake cylinder assembly, comprising a tube circular in cross section throughout its length, an opening provided in said tube intermediate its ends to receive a fluid inlet block, said block extending within the interior of said tube to divide the tube into a pair of oppositely extending cylinders spaced from each other the thickness of the block, said block being provided with a fluid inlet to conduct actuating fluid into said cylinders, and with means to mount the assembly on a support.

4. A brake cylinder assembly, comprising a tube formed to provide a pair of oppositely extending cylinders circular in cross section, a portion of said tube cut away between said cylinders to receive a fluid inlet block, said block extending into the interior of said tube to form a wall of a fluid inlet chamber and being bonded in said tube by a fluid tight alloy bond.

5. A brake cylinder assembly, comprising a tube, an opening provided in said tube intermediate its ends to receive a fluid inlet block, said block extending within the interior of said tube to divide the tube into a pair of oppositely extending cylinders spaced from each other the thickness of the block, said block being provided with a fluid inlet to conduct actuating fluid into said cylinders.

6. A brake cylinder assembly, comprising a tube formed to provide a pair of integral oppositely extending cylinders, a portion of said tube being cut away between said cylinders to receive a fluid inlet block, and said block extending into said tube to form a wall of a D-shaped fluid inlet chamber.

7. A brake cylinder assembly comprising a single drawn metal tube formed to provide a pair of coaxial cylinders of different diameters, said tube cut away at the junction formed by said two cylinders, means to support said cylinders and conduct fluid thereto comprising a block fitting in said cut-out portion and extending into the interior of said tube, said block provided with a pair of conduits, one of said conduits being arranged to intersect said tube tangentially.

8. The method of making a fluid connection with a brake cylinder formed of drawn metal, including the steps of cutting a slot through the side wall of the cylinder in such a manner as to provide an opening defined by plane surfaces, forming a fluid conducting member having plane surfaces adapted to coincide with the plane surfaces of said opening, inserting said fluid conducting member into said opening to position a portion of same within the interior of said cylinder with the adjacent surfaces of said conducting member and the walls of said opening in contact, and forming a fluid tight alloy bond between said adjacent surfaces by a copper brazing operation.

9. The method of making a fluid connection with a hollow member having a curved side wall, including the steps of forming a slot in the side wall of the cylinder in such a manner as to provide an opening defined by plane surfaces normal to the axes of the cylinder, forming a fluid conducting member having plane surfaces adapted to coincide with the said plane surfaces of said opening, inserting said fluid conducting member into said opening with the adjacent surfaces of said conducting member and the walls of said opening in contact, and forming a fluid tight alloy bond between said adjacent surfaces.

10. The method of making a fluid connection with a hollow member having a curved side wall, including the steps of cutting a slot through the side wall of the cylinder in such a manner as to provide an opening defined by plane surfaces normal to the axis of the cylinder, forming a fluid conducting member having plane surfaces adapted to coincide with the said plane surfaces of said opening, inserting said fluid conducting member into said opening with the adjacent surfaces of said conducting member and the walls of said opening in contact, and forming a fluid tight connection between said adjacent surfaces by a copper brazing operation.

11. The method of making a brake cylinder assembly comprising, drawing a single metal tube to form a pair of connected cylinders of different diameters, cutting away a portion of each of said cylinders at their junction, fitting a fluid conducting member into the opening formed by said cutting operation and bonding said member to each of said cylinders throughout substantially the entire areas of contact therebetween.

12. The method of making a brake cylinder assembly which comprises the drawing of a metal tube, reducing a portion of said tube to provide a pair of cylinders, flanging the outer ends of each of said cylinders, cutting a rectangular opening in said tube at the junction of said cylinders, fitting a block into said cut-away portion and copper brazing said block to said tube, forming conduits in said block and threading a portion of said block.

WILLIAM K. HAWKS.